US005475498A

United States Patent [19]

Radice

[11] Patent Number: 5,475,498

[45] Date of Patent: Dec. 12, 1995

[54] RECORDING RANDOM DATA HAVING A FIRST DATA RATE ON A DIGITAL VIDEO RECORDER AT AN INDEPENDENT SECOND DATA RATE

[75] Inventor: Anthony M. Radice, Riverside, N.J.

[73] Assignee: General Instrument Corporation, Hatboro, Pa.

[21] Appl. No.: 104,254

[22] Filed: Aug. 10, 1993

Related U.S. Application Data

[63] Continuation of Ser. No. 792,140, Nov. 13, 1991, abandoned.

[51] Int. Cl.[6] .............................. H04N 5/76; G11B 5/00; G11B 5/09

[52] U.S. Cl. .............................................. 358/335; 360/32

[58] Field of Search .................................... 358/335, 310, 358/323, 342, 442, 479; 360/32, 33.1, 35.1; 348/441; 341/159, 144; H04N 5/76, 5/78, 5/781, 5/782, 5/783, 5/95, 9/79

[56] References Cited

U.S. PATENT DOCUMENTS 3,781,685 12/1973 Ching ........................................ 375/30
3,789,137 1/1974 Newell .................................... 358/341
4,131,885 12/1978 Ninomiya ............................... 341/159
4,473,850 9/1984 Foerster et al. ........................... 360/32
4,519,008 5/1985 Takenouchi et al. ..................... 360/32
4,563,702 1/1986 Heller et al. .
4,575,773 3/1986 Dymond et al. ......................... 358/335
4,613,901 9/1986 Gilhousen et al. .
4,665,444 5/1987 van der Werf et al. .................. 360/32
4,787,085 11/1988 Suto et al. .
4,853,914 8/1989 Okano et al. ........................... 358/322
4,868,686 9/1989 Guisinger et al. ..................... 360/33.1
4,914,527 4/1990 Asai et al. ............................... 360/32
5,018,020 5/1991 Dakin ..................................... 358/341
5,067,029 11/1991 Takahashi .............................. 358/335
5,084,852 1/1992 Bailey .................................... 358/342
5,144,453 9/1992 Inga et al. .............................. 358/335
5,148,417 9/1992 Wong et al. ......................... 369/44.28

*Primary Examiner*—Thai Q. Tran
*Attorney, Agent, or Firm*—Barry R. Lipsitz

[57] ABSTRACT

Interface apparatus is provided for enabling a digital video recorder to function as a universal data recorder. A random input data stream provided at a first data rate is converted to a format that emulates a video signal. The converted input data is input, at a video signal data rate, to a digital video recorder for storage. The stored converted data is played back from the video recorder at the video signal data rate. The retrieved data is then converted back to the original format of the input data stream at the first data rate.

18 Claims, 3 Drawing Sheets

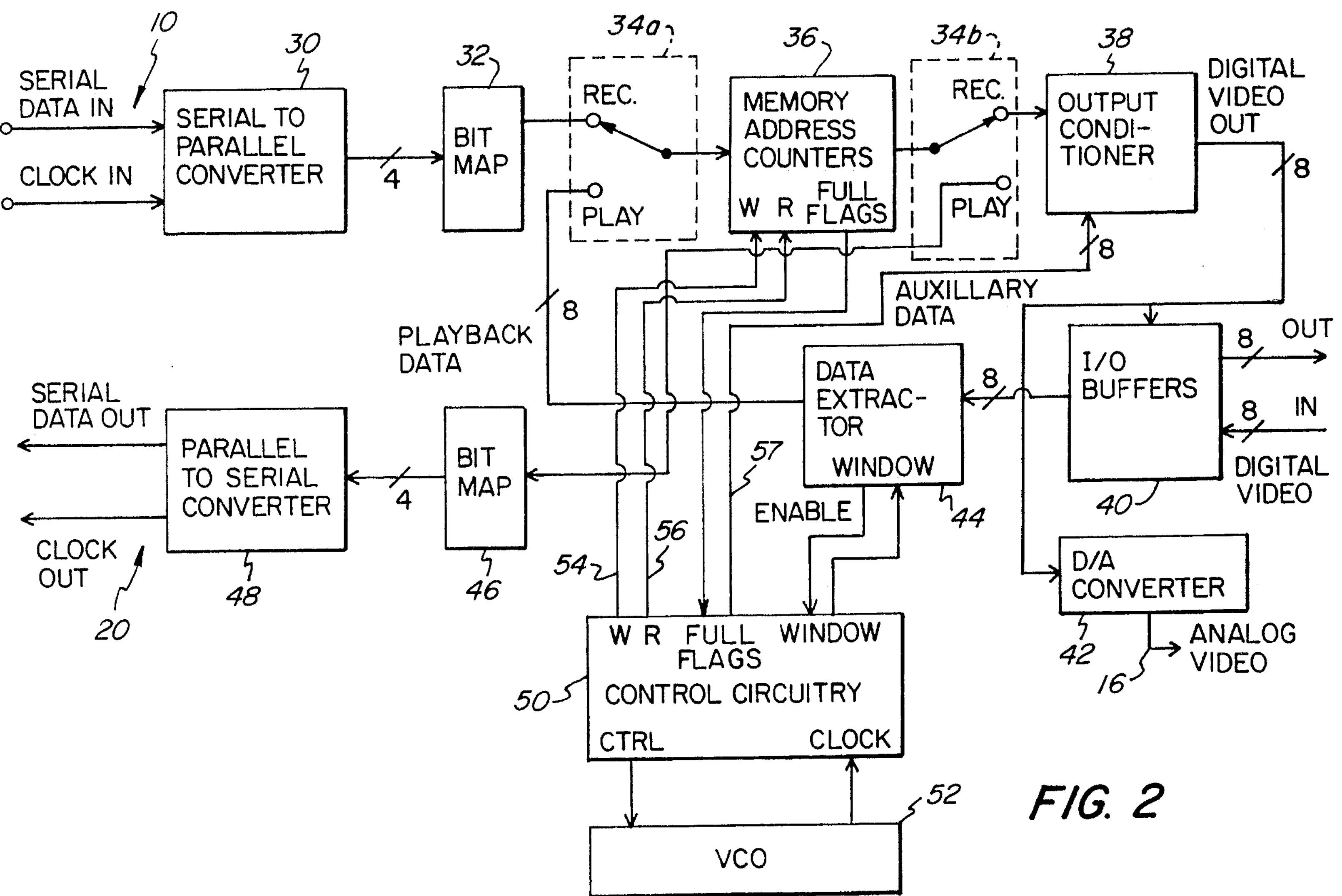
SERIAL DATA IN
CLOCK IN
10
30
SERIAL TO PARALLEL CONVERTER
4
32
BIT MAP
34a
REC.
PLAY
36
MEMORY ADDRESS COUNTERS
W R FULL FLAGS
34b
REC.
PLAY
38
OUTPUT CONDI- TIONER
DIGITAL VIDEO OUT
8
8
AUXILLARY DATA
PLAYBACK DATA
8
DATA EXTRAC- TOR
WINDOW
8
I/O BUFFERS
8 OUT
8 IN
DIGITAL VIDEO
40
44
57
ENABLE
D/A CONVERTER
42
ANALOG VIDEO
16
SERIAL DATA OUT
CLOCK OUT
20
PARALLEL TO SERIAL CONVERTER
48
4
BIT MAP
46
54
56
W R FULL FLAGS
WINDOW
CONTROL CIRCUITRY
CTRL
CLOCK
50
52
VCO
FIG. 2

RECORDING RANDOM DATA HAVING A FIRST DATA RATE ON A DIGITAL VIDEO RECORDER AT AN INDEPENDENT SECOND DATA RATE

This application is a continuation of commonly assigned, U.S. patent application Ser. No. 07/792,140 filed Nov. 13, 1991 now abandoned.

BACKGROUND OF THE INVENTION

The present invention relates to the recordal of digital data on a digital video recorder, and more particularly to the use of a digital video recorder as a universal data recorder.

Digital video tape recorders are well known. Due to their high cost, such devices are currently used primarily by television programmers and broadcasters to record television programs in a high quality digital format. The programs may then be transmitted in a conventional format such as over the airwaves, via satellite, or via a cable television network for receipt by television viewers. It is expected that the cost of digital video tape recorders will substantially decrease in the future. At such time, such apparatus is expected to become a consumer product, replacing current analog video tape recorders used in the home.

Digital video tape recorders receive signals in a conventional digital television format. For example, a digital format analogous to the standard NTSC (National Television Systems Committee) format used to broadcast television signals in North America can be used. The NTSC format provides television channels in six MHz bandwidths that carry video information on a line-by-line basis. The video information for a given television line is preceded by timing and control information for the video data on that line.

Various systems are known for transmitting data on an analog video waveform. For example, scrambled digital audio information can be transmitted in nonvideo portions of a video waveform. Two such systems are disclosed in U.S. Pat. No. 4,563,702 entitled "Video Signal Scrambling and Descrambling Systems" to Heller, et al and U.S. Pat. No. 4,613,901 entitled "Signal Encryption and Distribution System for Controlling Scrambling and Selective Remote Descrambling of Television Signals" to Gilhousen, et al. These systems provide for digital stereo audio transmission in the horizontal blanking interval of an NTSC television signal.

In another known system, described in U.S. Pat. No. 4,787,085 entitled "Digital Signal Transmitting System" to Suto, et al, digital signals that are not limited to audio and video components of a television signal are time division multiplexed and modulated to form a signal having a bandwidth corresponding to one channel portion of a television broadcast signal. A receiver extracts the digital data corresponding to a desired signal and supplies it to an appropriate appliance such as a computer, stereo set, or facsimile machine that converts the data into a useful form for a user. In the Suto, et al system, all signals are transmitted in a digital format, requiring a separate receiver that is not compatible with existing cable television converters or satellite television receivers.

Improvements in television signal transmission and reception are currently being developed using digital techniques. For example, high definition television systems are expected to be commercialized in several years that transmit compressed digital audio and video information to provide television quality far superior than that currently available.

Encoders for processing the digital HDTV signals are very expensive. It would therefore be advantageous to provide a system for sharing a single encoder among various television programs. One way to do this would be to record separately encoded program signals for subsequent transmission via satellite, cable or over the air. In this manner, a single encoder could be used to encode any number of programs for recordal prior to transmission. These prerecorded programs could then be transmitted at any time according to a broadcaster's programming schedule.

It would be further advantageous to provide a relatively simple and inexpensive scheme for recording random data on a digital video recorder. The term "random data" as used herein means data that is not limited to television signal (i.e., audio and video) data. In the HDTV context, such data can include the compressed video digital data stream as well as audio data, access control data, and timing data for a television signal. Such data could also comprise nontelevision data, such as any digital data stream received from a computer or other device. The ability to use a digital video recorder to record such random data would obviate the need to purchase a separate storage device to store nonvideo data.

The present invention provides an interface that enables the recording and playback of random data on a digital video recorder. The interface connects to the input and output ports of a standard digital video recorder, without requiring modification of the recorder circuitry.

SUMMARY OF THE INVENTION

In accordance with the present invention, interface apparatus is provided for enabling a digital video recorder to function as a universal data recorder. First means convert an input data stream having a first format and provided at a first data rate to a second format that emulates a digitized video signal. Means are provided for inputting the converted input data, at a video signal data rate, to a digital video recorder for storage. In a preferred embodiment, the video signal data rate is a multiple of a video subcarrier frequency. Means are provided for retrieving the stored converted data from the video recorder at the video signal data rate. Second means convert the retrieved data back to the first format at said first data rate.

In a preferred embodiment, means are provided for converting the converted input data, at the video signal data rate, to an analog video signal. The analog video signal is input to a timing input of the digital video recorder for use in synchronizing the video recorder.

The first converting means can comprise first bit map means for mapping bits from the input data stream to bytes corresponding to different video levels. Means are provided for writing said bytes into a memory at a symbol rate that is a function of the first data rate. The bytes are read from the memory at the video signal rate, and combined with auxiliary data corresponding to at least one of video synchronization, blanking and burst data to provide a format emulating a digital video signal. The first converting means can further comprise serial to parallel converter means for receiving the input data stream in a serial format and converting it into a parallel format for input to the first bit map means.

In an illustrated embodiment, the second converting means comprise means for deleting the auxiliary data from the retrieved data. The retrieved data is written into a memory after the auxiliary data has been deleted therefrom, at the video data rate. Means are provided for reading the retrieved, written data from the memory at said symbol rate. Second bit map means map bytes of the data read from the memory into bits corresponding to data in the input data stream.

The second converting means can further comprise means for suspending the writing of the retrieved data into memory during a vertical blanking interval identified by the auxiliary data. In the event that the input data stream is received as serial data, the second converting means comprise parallel to serial converting means for converting bits from the second bit map means to a serial format at the first data rate.

Means are provided for monitoring an amount of space available in the memory used by the second converting means. Means responsive to the monitoring means detect if the memory is emptying or filling at a rate faster than a threshold value during a concurrent writing and reading of the retrieved data to and from the memory. Means responsive to the detecting means provide a timing reference signal for input to the digital video recorder. The timing reference signal is used to control the rate at which data is output from the digital video recorder, so that the memory level is maintained substantially constant. Means responsive to the monitoring means are also provided for inhibiting the reading of data from the memory until the memory has been filled to a predetermined amount of its capacity.

A method in accordance with the present invention converts an input data stream, provided at a first data rate and carrying data that is not part of a television program signal, into a digital video recorder input signal having a format that emulates a digitized video signal. The recorder input signal is input to a digital video recorder at a second data rate, which may be a multiple of a video subcarrier frequency, used by the recorder to record video data. Digital data is played back from the video recorder by retrieving a recorded signal at the second data rate, and converting the retrieved data to the equivalent of the input data stream at the first data rate.

In a preferred embodiment, an analog video signal is generated during playback of the digital video recorder. The analog video signal contains timing information, that is input to a timing input of the recorder. In this manner, the analog video signal is used to correct the rate at which data is output from the digital video recorder during playback.

The step of converting the input data stream to the recorder input signal comprises the steps of mapping bits from the input data stream to bytes corresponding to different video levels. The bytes are written into a memory at a symbol rate that is a function of the first data rate. Bytes are read from the memory at said second data rate, and combined with auxiliary data corresponding to at least one of video synchronization, blanking and burst data to provide the recorder input signal.

In order to convert the retrieved data back to the equivalent of the input data stream, the auxiliary data is deleted. After such deletion, the retrieved data is written into a memory at said second data rate. This data is then read from the memory at the symbol rate, and bytes of this data are mapped into bits corresponding to data in the input data stream. In a preferred embodiment, the writing of the retrieved data into memory is suspended during a period of time corresponding to a vertical blanking interval identified by the auxiliary data.

The amount of space available in the memory into which the retrieved data is written is monitored. In response to the monitoring step, a determination is made as to whether the memory is emptying or filling at a rate faster than a predetermined threshold value when data is being concurrently written to and read from the memory. In response, a timing reference signal is provided for input to the digital video recorder. The timing reference signal controls the rate at which the video recorder outputs recorded data therefrom. The reading of data from the memory can be inhibited during playback until the memory has been filled to a predetermined amount of its capacity.

BRIEF DESCRIPTION OF THE DRAWINGS

FIG. 2 is a detailed block diagram of the recorder interface illustrated in FIG. 1.

DETAILED DESCRIPTION OF THE INVENTION

The present invention enables the recording and playback of random data on a video recorder, such as a digital video tape recorder. Those skilled in the art will appreciate that future video recorders may utilize data storage media other than magnetic tape, and all such alternatives are intended to fall within the scope of the present specification and claims.

Random data is defined herein as data in any format, which can comprise nonvideo data such as text data, numerical data, or control data, as well as video data which may or may not be compressed. Apparatus is provided consisting of an interface that connects to the input and output ports of a video recorder such as a D2 digital VCR or other machine capable of recording and playing back a digitized video signal. No modification of the digital recorder circuitry is required. Storage of digital data on video tape or the like for subsequent playback and retrieval is thereby provided.

A primary application for the apparatus and method of the present invention is to record compressed digital television data, for example in a high definition television format, on a digital NTSC video tape recorder. The ability to store such data on a conventional video recorder for future playback and transmission will provide a substantial economic benefit to television broadcasters, satellite programmers, and cable television operators.

Figure 1:
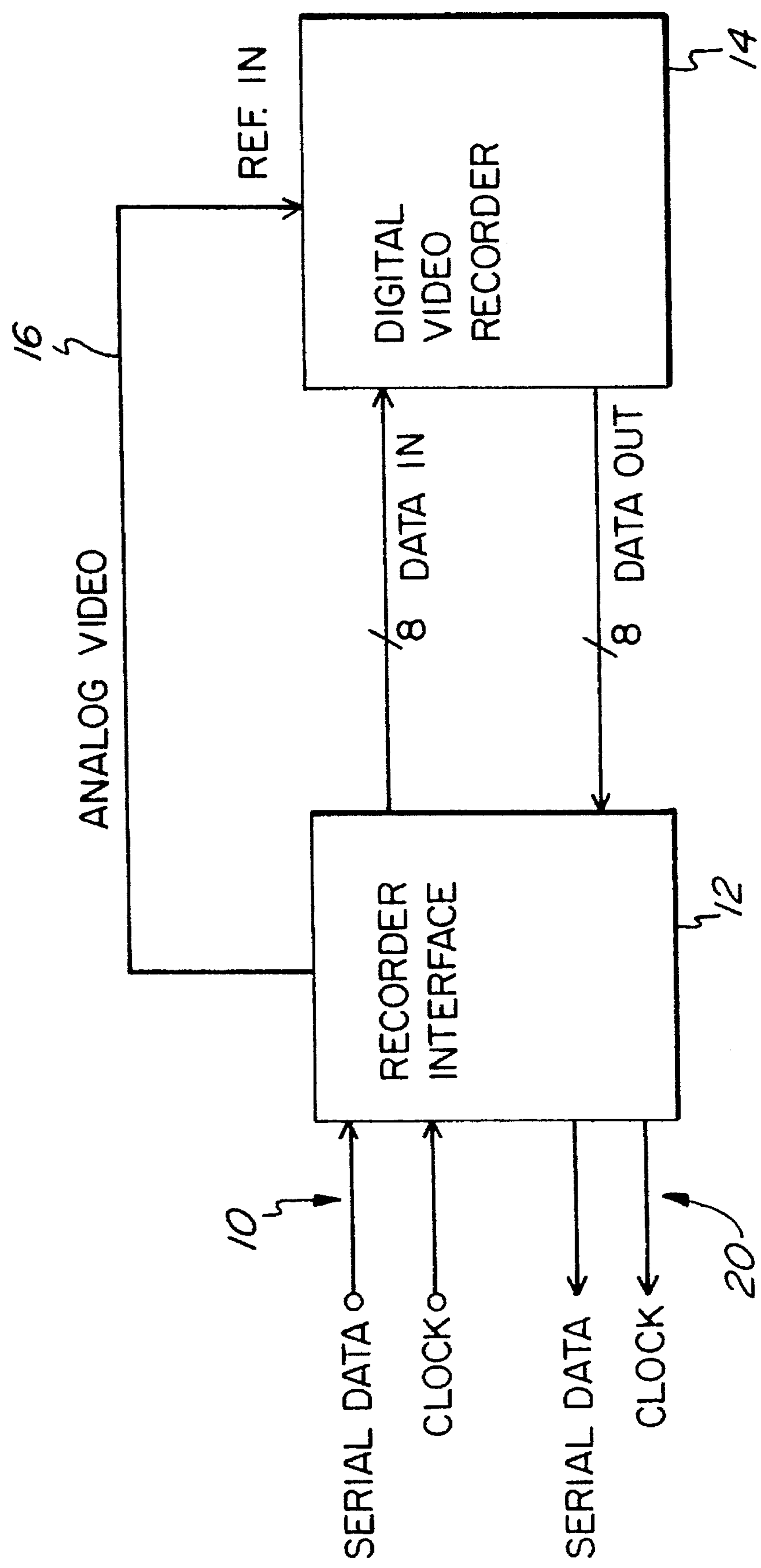
FIG. 1 is a block diagram illustrating the interconnection between a recorder interface in accordance with the present invention and a conventional digital video recorder.

FIG. 1 illustrates, in block diagram form, the interconnections between the recorder interface 12 of the present invention and a digital video recorder 14. Serial data and clock signals generally designated 10 are input to the interface 12 and converted to a parallel data stream. Additional data is added by the recorder interface to the parallel data stream to provide a new data stream that emulates a digitized video signal. This data stream is input to the digital video recorder 14 and recorded on a magnetic tape or other media. Recorder interface 12 also generates an analog video signal 16 which serves as a synchronization reference for the digital video recorder 14. As described in more detail below, the analog video signal is used to control the rate at which data is played back from digital video recorder 14, thereby facilitating the efficient retrieval of the stored data and reconstruction of the original input serial data stream by recorder interface 12. The input serial data and clock frequencies are limited only by the operating limitations of the data processing circuitry contained in recorder interface 12. In the illustrated embodiment, the parallel data output from recorder interface 12 and input to digital video recorder 14 is sent at a video signal data rate of 14.31818 MHz. Those skilled in the art will appreciate that this frequency is exactly four times the standard color burst frequency in an NTSC color television signal.

Retrieval of the original input data 10 from digital video recorder 14 is accomplished by placing the digital video recorder in a playback mode of operation. The recorded data played back by the recorder is input to recorder interface 12, which strips out the auxiliary data that had been added by the interface. The recorder interface 12 then converts the remaining parallel data from digital video recorder 14 to a serial data stream at the input data rate.

FIG. 2 illustrates the recorder interface in greater detail. The serial input data 10 is converted by a serial to parallel converter 30 to four-bit parallel data at one-fourth the input clock rate (hereinafter referred to as the "symbol" rate). The groups of parallel data bits are input to a bit map 32, which can comprise a read only memory (ROM), where they are mapped to eight bit bytes corresponding to a desired range of video levels (i.e., black to white IRE values). The output of the bit map 32 consists of a series of bytes that are written during the record mode of operation into a memory 36 via a record/playback switch **34*a*. The data is written into memory 36 at the symbol rate. Those skilled in the art will appreciate that memory 36 can comprise either a first-in first-out register, or may be implemented in random access memory (RAM). In either event, when power is initially applied to the system, memory 36** is cleared, all flags are reset and the start address for writing to the memory is set into an address counter. Writing of data into the memory then proceeds at the constant symbol rate.

Figure 3:
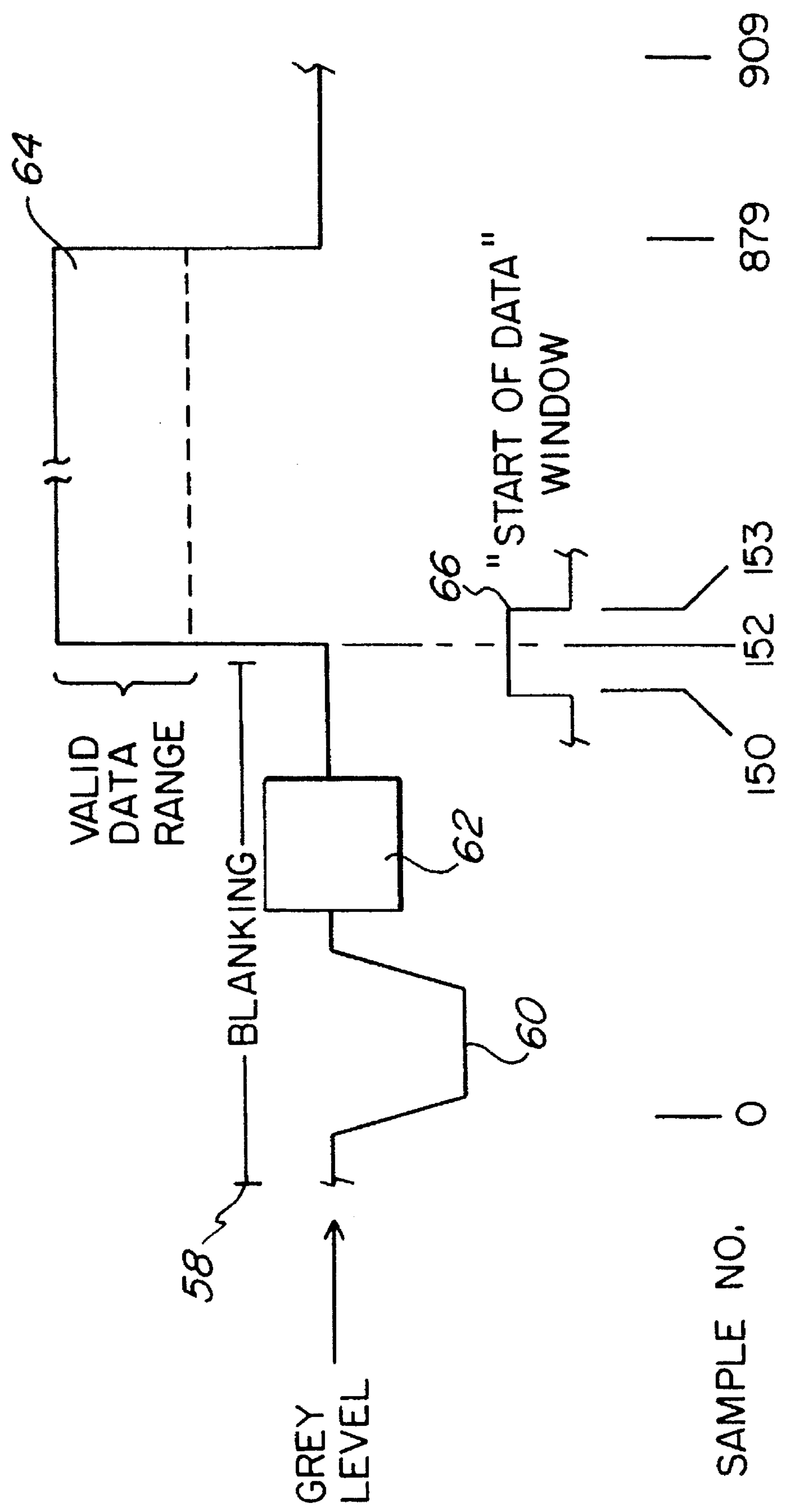
FIG. 3 is a diagram illustrating random data that has been formatted to emulate a video signal in accordance with the present invention.

In a preferred embodiment, when enough bytes of data have been written into the memory to fill about 20% of the memory capacity, the memory read function is enabled by control circuitry 50. Data is read from the memory in bursts at the 14.31818 MHz video signal data rate. This is the data rate necessary to input data to digital video recorder 14 (FIG. 1). The start of data recording can occur anywhere within an active video field 64 (FIG. 3).

In accordance with the present invention, the memory output data is structured into groups of 728 bytes. As illustrated in FIG. 3, this fills the width of the video signal portion 64 of a digital video waveform, where the video data is sampled from sample number 152 to sample number 879.

The data bits output from memory 36 are input, via record/playback switch **34*b*, to an output conditioner 38. The output conditioner combines the data bytes with the digital equivalents of video blanking 58, synchronization 60, and burst 62 signals ("auxiliary data") to generate a digitized video signal in accordance with the SMPTE 240M standard. The digitized video signal is forwarded to the digital video recorder's input via conventional input/output buffers 40**.

Recorder interface 12 can accommodate a wide range of data rates, since the input data rate is limited only by the operational limitations of the interface circuitry itself and not by other constraints. Video lines not occupied by data are presented to the video recorder at a fixed data level, e.g., a grey level. As indicated in FIG. 2, a digital to analog converter 42 is provided to convert the digitized composite video output from output conditioner 38 into an analog signal. This analog video signal is input to the timing reference input of the digital video recorder 14 for synchronization purposes.

Playback of prerecorded data from the video recorder is accomplished by performing the reverse of the recording process. Prior to playing back the data, memory 36 is cleared, all flags are reset and the start address for writing is set into the memory address counter. Prior to writing the playback data into the memory, the auxiliary video data (sync, burst and blanking) is deleted from the data by a data extractor 44 that receives the data via input/output buffers 40. Data extractor 44 operates by responding to a "start of data" window 66 generated by control circuitry 50 at an appropriate time during each active video line, as illustrated in FIG. 3. Window 66 is three samples wide in order to accommodate the fact that, during playback, the video recorder may shift active video by two samples in order to maintain the correct chroma phase relationship. As indicated in FIG. 3, the window extends from sample number 150 to sample number 153. The active video portion 64 of the waveform nominally commences at sample 152. If, during the time the window is open, a data byte is detected that is not equivalent to the grey level of the signal, then the data is considered to be valid data and the memory write process is started by control circuitry 50 in response to an enable signal output from data extractor 44. A counter in the control circuitry is started in conjunction with the write process. When 728 bytes have been written into memory, the write process is stopped until valid data is again detected by the data extractor. This sequence suspends the writing of data into memory during the vertical blanking portion of the emulated television waveform.

Control circuitry 50 handles the timing and advises data extractor 44 when to open and close the start of data window 66. Upon detecting the first valid data bit, data extractor 44 outputs an enable signal to control circuitry 50, so that writing of the data into memory 36 can be commenced via the issuing of a write signal on line 54. The data is written into memory 36 in bursts at the 14.31818 MHz video data rate. The memory is permitted to fill to about 80% of its capacity before a memory read operation is initiated by control circuitry 50 via read line 56.

The memory read operation is performed at the symbol rate. After data is read out of the memory, it is reformatted by a bit map 46, that can comprise a ROM. Bit map 46 performs an inverse of the original bit mapping process performed by bit map 32. Thus, the original four bit data symbols are output from bit map 46 to a parallel to serial converter 48. The symbols are converted in converter 48 to serial data, and output at the original clock rate as designated generally at 20.

The filling of memory 36 by the playback data is controlled by varying the frequency of a voltage controlled oscillator 52 that outputs the 14.31818 MHz clock signal. A VCO control signal (CTRL) is output from the control circuitry 50 for this purpose. If memory 36 empties too quickly, as detected by control circuitry 50 via a "full flags" signal from the memory, the output frequency of VCO 52 is slowly increased, thereby increasing the reference input frequency slightly. This has the net effect of increasing the output data rate of the video recorder and, therefore, the input data rate to the memory. Similarly, if the memory begins to fill up, the reference frequency output by VCO 52 is decreased in order to slow down the output data rate of the video recorder.

The recorder's output data rate is controlled by the analog video signal output from digital analog converter 42. During the playback mode of operation, the analog video signal will contain only the auxiliary data (e.g., sync, blanking and burst) output on line 57 from control circuitry 50. The video recorder responds to the burst data contained in the analog video signal to provide the necessary playback data rate.

It should now be appreciated that the present invention provides a method and apparatus for enabling a digital video recorder to function as a universal data recorder. This is accomplished by converting an input data stream into a format that emulates a video signal of the type the video recorder is designed to record. The data to be recorded is provided in the video information portion of the video signal format. Auxiliary data, corresponding to video sync, blanking and burst information, is added to the data to be stored, and the composite signal is input to the video recorder for storage. On playback, the auxiliary data is removed, and the data of interest is reformatted to its original state.

Although the invention has been described in connection with a preferred embodiment, those skilled in the art will appreciate that numerous adaptations and modifications may be made thereto without departing from the spirit and scope of the invention, as set forth in the claims.

What is claimed is:

1. Interface apparatus for enabling a digital video recorder to function as a universal data recorder comprising:

means for receiving an input digital data stream in a first format at a first data rate that is independent of a video signal data rate;

first means for providing data from said input data stream in a second format that emulates video portions of a video signal, said second format comprising a plurality of video levels, each video level representative of a group of at least two bits of said input data stream, wherein successive groups of said input data stream are bit mapped to bytes corresponding to video levels of the second format, each group being uniquely identified by a corresponding video level within a range of at least four video levels extending from black to white IRE levels;

means for outputting the data in said second format, at said video signal data rate, to a digital video recorder for storage;

means for retrieving the stored data in said second format from said video recorder at said video signal data rate; and second means for providing the stored data retrieved from said video recorder in said second format as a data stream in said first format at said first data rate.

2. Interface apparatus in accordance with claim 1 further comprising:

means for converting the data in said second format, at said video signal data rate, to an analog video signal; and means for inputting said analog video signal to a timing input of said digital video recorder.

3. Interface apparatus in accordance with claim 1 wherein said first means comprise:

means for writing said bytes into a memory at a symbol rate that is a function of said first data rate;

means for reading said bytes from said memory at said video signal rate when enough bytes are available to fill the active video portion of a television line; and means for combining the bytes read from said memory with auxiliary data corresponding to at least one of video synchronization, blanking and burst data for input to said digital video recorder in the form of television lines in which the active video portion is filled with a sequence of said video levels;

wherein said digital video recorder is provided with a television line in which the active video portion is set to a fixed video level not identified with any of said groups when enough of said bytes are not available to fill the active video portion.

4. Interface apparatus in accordance with claim 3 wherein said first means further comprise:

serial to parallel converter means for receiving said input data stream in a serial format and converting it to a parallel format to provide said groups.

5. Interface apparatus in accordance with claim 3 wherein said second means comprise:

means for deleting said auxiliary data from the retrieved data;

means for writing the retrieved data after said deletion into a memory at said video data rate;

means for reading said retrieved, written data from said memory at said symbol rate; and bit map means for mapping bytes of the retrieved data read from said memory into bits corresponding to data in said input data stream.

6. Interface apparatus in accordance with claim 5 wherein said first means further comprise:

serial to parallel converter means for receiving said input data stream in a serial format and converting it to a parallel format to provide said groups; and wherein said second means further comprise:

parallel to serial converter means for converting bits from said bit map means to a serial format at said first data rate.

7. Interface apparatus in accordance with claim 5 further comprising:

means for monitoring an amount of space available in the memory used by said second means;

means responsive to said monitoring means for detecting if the memory is emptying or filling at a rate faster than a threshold value during a concurrent writing and reading of the retrieved data to and from the memory; and means responsive to said detecting means for providing a timing reference signal for input to said digital video recorder.

8. Interface apparatus in accordance with claim 7 further comprising:

means responsive to said monitoring means for inhibiting the reading of retrieved data from said memory until the memory has been filled to a predetermined amount of its capacity.

9. Interface apparatus in accordance with claim 7 further comprising:

digital to analog converter means for converting said auxiliary data to analog form to provide said timing reference signal.

10. A method for using a digital video recorder to record random data, comprising the steps of:

converting an input data stream, provided at a first data rate in a first format and carrying digital data that is not part of a television program signal, into a recorder input signal having a second format that emulates video portions of a video signal, said second format comprising a plurality of video levels, each video level representative of a group of at least two bits of said input data stream, wherein successive groups of said input data stream are bit mapped to bytes corresponding to video levels of the second format, each group being uniquely identified by a corresponding video level within a range of at least four video levels extending from black to white IRE levels; and inputting the recorder input signal to a digital video recorder at a second data rate independent of said first data rate and used by said recorder to record video data.

11. A method in accordance with claim 10 wherein said digital video recorder is used to playback random data, comprising the steps of:

retrieving a recorded signal from said video recorder at said second data rate; and converting the retrieved data to said first format at said first data rate.

12. A method in accordance with claim 11 comprising the further steps of:

generating an analog video signal containing timing information during playback of said digital video recorder; and inputting said analog video signal to a timing input of said digital video recorder;

wherein said analog video signal is used to control the rate at which data is output from said digital video recorder during playback.

13. A method in accordance with claim 10 wherein said step of converting said input data stream to said recorder input signal comprises the steps of:

writing said bytes into a memory at a symbol rate that is a function of said first data rate;

reading said bytes from said memory at said second data rate when enough bytes are available to fill the active video portion of a television line; and combining the bytes read from said memory with auxiliary data corresponding to at least one of video synchronization, blanking and burst data to provide said recorder input signal in the form of television lines in which the active video portion is filled with a sequence of said video levels;

wherein said recorder is provided with a television line in which the active video portion is set to a fixed video level not identified with any of said groups when enough of said bytes are not available to fill the active video portion.

14. A method in accordance with claim 11 wherein said step of converting said input data stream to said recorder input signal comprises the steps of:

writing said bytes into a memory at a symbol rate that is a function of said first data rate;

reading said bytes from said memory at said second data rate when enough bytes are available to fill the active video portion of a television line; and combining the bytes read from said memory with auxiliary data corresponding to at least one of video synchronization, blanking and burst data to provide said recorder input signal in the form of television lines in which the active video portion is filled with a sequence of said video levels, wherein said recorder is provided with a television line in which the active video portion is set to a fixed video level not identified with any of said groups when enough of said bytes are not available to fill the active video portion; and said step of converting the retrieved data to said first format comprises the steps of:

deleting said auxiliary data;

writing the retrieved data after said deletion into a memory at said second data rate;

reading said retrieved, written data from said memory at said symbol rate; and mapping bytes of the retrieved data read from said memory into bits corresponding to data in said first format.

15. A method in accordance with claim 14 comprising the further steps of:

monitoring an amount of space available in the memory into which the retrieved data is written;

detecting, in response to said monitoring step, if the memory is emptying or filling at a rate faster than a threshold value during a concurrent writing and reading of the retrieved data to and from the memory; and providing, in response to said detecting step, a timing reference signal for input to said digital video recorder.

16. A method in accordance with claim 15 comprising the further step of:

inhibiting the reading of data from said memory during playback until the memory has been filled to a predetermined amount of its capacity.

17. Interface apparatus in accordance with claim 3 wherein said bytes each comprise eight bits of data and are output to said digital video recorder in bursts of about 728 bytes at a time.

18. Interface apparatus in accordance with claim 17 wherein said video signal data rate is about 14.31818 MHz.

* * * * *